Oct. 11, 1938.  D. W. BOYLAN  2,132,391
PIPE COATING IRONER
Filed Oct. 28, 1936  2 Sheets-Sheet 2
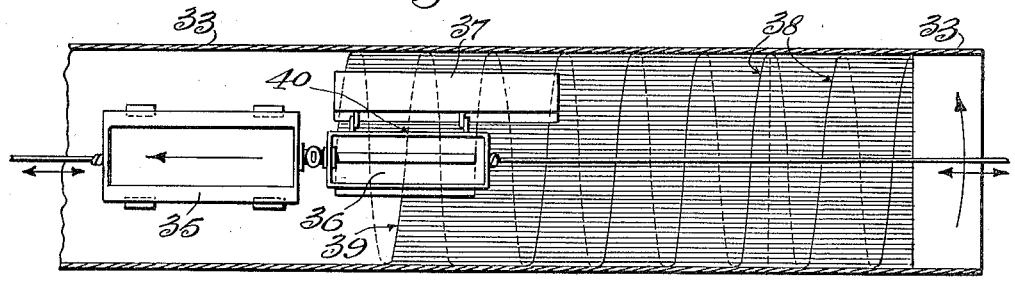
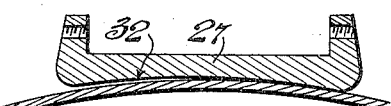
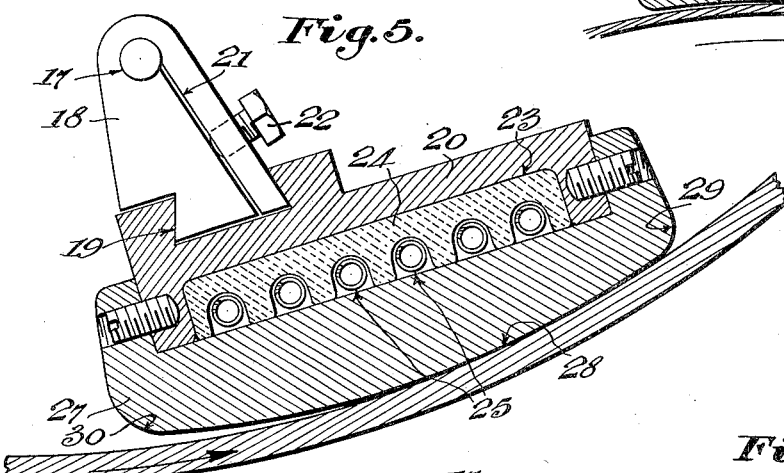
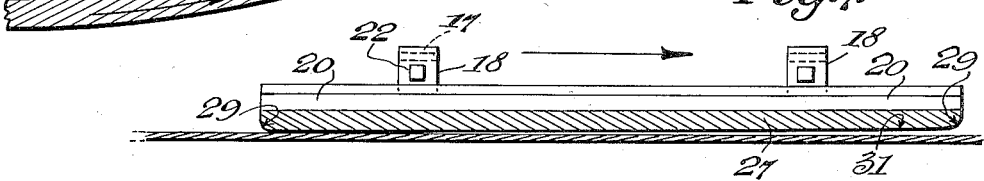
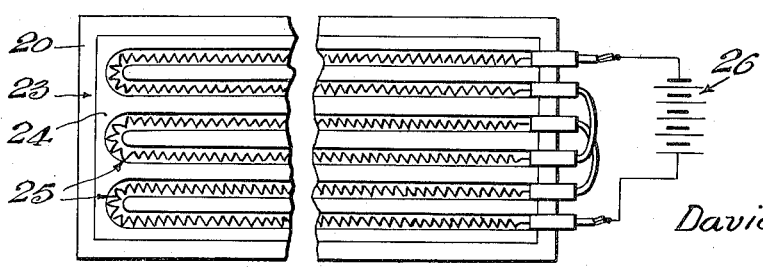
Inventor
David W. Boylan,
By [signature]
Attorney Patented Oct. 11, 1938

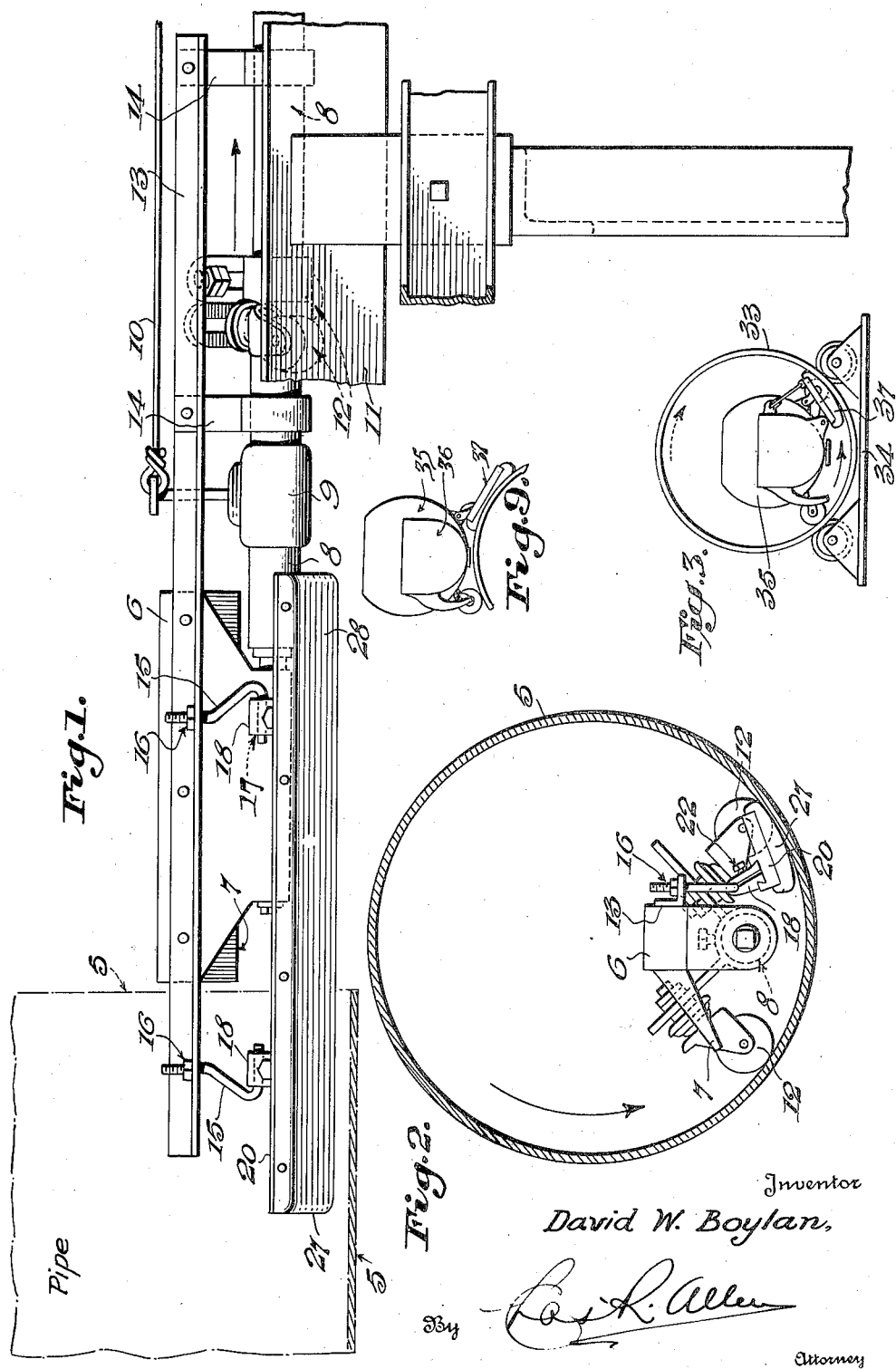

2,132,391

UNITED STATES PATENT OFFICE 2,132,391

PIPE COATING IRONER

David W. Boylan, San Francisco, Calif., assignor to the General Paint Corporation, San Francisco, Calif., a corporation of Nevada Application October 28, 1936, Serial No. 108,107

11 Claims. (Cl. 91—53)

The invention relates to the art of pipe coating and has for an object to provide a novel coating ironer for smoothing the coating material immediately after it is applied, thereby avoiding surface imperfections.

It is well known that pipes and tubing formed of known materials are subject to rust and corrosion, and that piping adapted for water conduits, either steel, cast iron or concrete, when used without suitable internal pre-treatment, is subject to the formation of tubercles. Tuberculation is no small factor to be considered by engineers in constructing water lines. Records are available which show that the supply of water to a city can be reduced as much as 10% by reason of the constriction of the internal diameter of the conduit by tubercle formation. According to one popular method of pipe coating the interiors of pipes are given a heavy coating of bituminous enamel which is applied hot and ultimately forms a very smooth lining such as will definitely prevent tuberculation and reduce to a minimum frictional resistance to fluid flow.

Coatings of any nature, internal or external, and particularly those of the character above alluded to, are subject to air bubble formation, especially where any turbulence is set up incident to the application thereof, and the resultant air pocket formations provide surface imperfections in the finished product. Moreover, when the coating is applied in the form of a helical ribbon, as disclosed in my application for Letters Patent, Serial No. 108,105, filed October 28, 1936, there is a tendency to produce a rifled effect.

In its more detailed nature therefore, my present invention seeks to provide a novel coating ironer structure, having provision for the application of heat, and which is so mounted as to engage the coated surface immediately after the coating is applied to press out air pockets and to so smooth the surface as to avoid formation of surface imperfections and assure the smooth, unbroken finished appearance desired.

Another object of the invention is to provide a coating ironer including a standard carrier with provision for applying heat thereto, and removable ironer shoes adapted for engaging either internal or external pipe surfaces.

Another object of the invention is to provide novel means for adjustably supporting the ironer device.

With the above and other objects in view which will hereinafter appear, the invention further resides in the novel details of construction, combination and arrangement of parts, all of which will be first fully described in the following detailed description, then particularly pointed out in the appended claims, reference being had to the accompanying drawings.

In the drawings:

Figure 1 is a side elevation showing my invention attached to a fragment of a machine for applying coating to the interior of pipes.

Figure 2 is a left end elevation of the parts shown in Figure 1.

Figure 3 is an end elevation illustrating my invention applied to an apparatus for coating pipes in the field.

Figure 4 is a diagrammatic horizontal section illustrating one method of coating pipes and ironing the coating by use of apparatus such as is shown in Figures 1 and 3.

Figure 5 is a detail vertical cross section of my improved coating ironer.

Figure 6 is a detail vertical cross section of a removable shoe of the external surface engaging type.

Figure 7 is a somewhat diagrammatic longitudinal section of the coating ironer showing its relation to the surface of the pipe-to-be-coated.

Figure 8 is an inverted plan view of the shoe carrier of the coating ironer, illustrating one example of means for applying heat to the ironer.

Figure 9 is a diagrammatic fragmentary end elevation illustrating the invention positioned for use upon the external surface of a pipe.

In Figures 1 and 2 of the drawings, I have illustrated the invention applied to a pipe lining or internal coating machine of the type disclosed in co-pending application for patent Serial No. 108,110, filed by David W. Boylan, C. F. Morain, and Otto R. Bowman on October 28, 1936. In these figures, the pipe-to-be-coated is indicated at 5, the coating applicator at 6, and the applicator lip, from which the hot bituminous coating material flows in a velvety ribbon, at 7. In the machine referred to, the coating applicator is carried at the end of a pipe or conduit 8 from which the coating material flows into the applicator through a control valve 9, means in the form of pull cables 10 being provided so that the control valve may be actuated from a remote point.

The conduit 8 and the applicator 6 supplied therefrom are supported for longitudinal travel back and forth by trackways 11, suitable casters 12 being secured to the conduit in position to ride upon said trackways. It should be understood that the trackways 11 form the normal support for the traveling applicator, but when the applicator is projected into the interior of the pipe to be lined or coated, the supporting casters 12 ride over the internal surface of the pipe as illustrated in Figure 2, the casters being free to move so as to adapt themselves to the relative directions of travel of the pipe and applicator parts.

It will be observed by reference to Figures 1 and 2 that an angle iron or support bar 13 is secured to the conduit 8 as at 14 and projects longitudinally so as to aid in supporting the applicator 6 and to provide a support for a pair of hanger rods 15 which are vertically-adjustably suspended from the member 13 as indicated at 16.

The hanger rods are shaped to provide horizontal portions receivable in bores 17 provided in the mounting lugs or ears 18 which project from the coating ironer forming the subject matter of my present invention. The lugs 18 include dovetail end portions which are slidably adjustable as to position in a longitudinal dovetail groove 19 formed in the standard carrier 20 comprising the body portion of the ironer. See Figures 5, 6 and 7. Each of the lugs 18 is split as at 21 and equipped with a set screw 22 mounted as shown in Figure 5 of the drawings so that when it is screwed home it will tend to spread the dovetail end of the lug and secure it in its adjusted position in the carrier slotway 19. By this means it is possible to adjust the ironer longitudinally upon the hanger rods 15, and by utilizing the adjustable connections 16 it is possible to adjust the ironer vertically with respect to the supporting member 13.

By reference to Figures 5 and 8, it will be observed that the carrier 20 is in the form of an open shell, the recessed portion 23 of which serves as a seat for a removable and replaceable heater unit 24. The heater unit may be of any approved construction and in this particular disclosure I have shown the well known electrical resistance type of heater in which the core 24 is grooved to accommodate the positioning of resistance coils 25 which may be connected together and with a source of electrical energy 26 as diagrammatically illustrated in Figure 8 of the drawings.

As has been stated, the body portion 20 or carrier of the ironer is standard and to this carrier may be affixed selected ironer shoe forms, thus adapting the device for use on either the interior or exterior surfaces of pipes. See Figures 5, 6 and 9.

In Figure 5 of the drawings, I have shown affixed to the carrier 20 an ironer shoe 27 adapted for engaging the internal surface of a pipe. The effective surface 28 of the shoe conforms generally to the internal curvature of the pipe. This surface, however, is not struck from the same arc as the internal surface of the pipe but is well-rounded at the trailing edge as illustrated at 29 and is shaped upon a compound curve at its leading edge as at 30 so as to assure against throwing up a wave of coating material and likewise avoid any tendency to rifle the coating. The end edges of the shoe are likewise rounded as indicated at 29 in Figure 7. It may be found desirable also to so mount the ironer, by utilization of the hanger adjustments 16, to position the leading end of the ironer slightly higher than the trailing end as illustrated at 31 in Figure 1. By this means, and by so shaping the ironer as to assure against presentation of any relative sharp edges to the coated surface of the pipe, I am able to assure the provision of a perfectly smooth coated surface which will be ultimately free of all surface imperfections such as might result from air pocket formations or the tendency to rifle.

In Figure 6 of the drawings, I have illustrated an ironer shoe of the external type, that is, one in which the pipe engaging surface is concave in cross section as at 32 instead of convex as indicated at 28 in Figure 5. By thus providing removable shoes my improved ironer is adapted for use for either internal or external coating and the shoes may be removed and replaced without disturbing the heating element or elements. By provision of the heating equipment, it is possible to iron or smooth out the coating material at the same or substantially the same temperature at which it is applied to the pipes and thus the elimination of surface imperfections and the provision of a perfectly smooth coated surface is greatly facilitated.

In Figures 3 and 4 of the drawings, I have diagrammatically illustrated the type of pipe coating apparatus disclosed in the application for patent of Clifford E. Morain, Serial No. 108,106, filed October 28, 1936. In this illustration, the pipe being coated is indicated at 33, the same being mounted upon a rigging generally indicated at 34 upon which the pipe is suitably supported and through the medium of which rotation may be imparted thereto in the manner described in said application for patent. In this type of apparatus there is included a wheeled truck 35 which carries the applicator generally designated 36 and the coating ironer generally designated 37. The Morain apparatus thus diagrammatically illustrated constitutes another form of apparatus by which my improved method of pipe coating disclosed in co-pending application Serial No. 108,105, filed October 28, 1936, can be practiced.

It will be understood that either of the applicators disclosed respectively in Figures 1 and 4 of the drawings are capable of coating pipes according to my improved method referred to. By properly moving the applicator along the pipe surface while the latter is being rotated, the thick velvety ribbon of hot bituminous enamel will flow from the applicator lip and be applied to the pipe surface in helical form, the individual helices preferably being so pitched as to overlap or shingle as at 38 with the ribbon centered on the terminal edge 39 of each previously laid helix as indicated at 40 in Figure 4 of the drawings.

In practice, the discharge lip of the applicator preferably is 20 to 24 inches in length so that the coating material, flowing gently from said lip, will be deposited on the pipe surface in the form of a thick velvety ribbon of hot bituminous enamel 20 to 24 inches wide. Although my improved ironer is not limited to use in practicing the method of pipe coating disclosed in my co-pending application hereinbefore referred to, it will be found particularly effective when so used. When my improved method of pipe coating is practiced, the applicator is drawn along the pipe surface a distance just half the width of the ribbon or from 10 to 12 inches for each revolution of the pipe as indicated in Figure 4. The principle of flowing on the coating material without force, pressure, or turbulence, does much toward entirely eliminating tiny air bubbles, skips or voids in the coating, and the use of my improved ironer greatly facilitates this elimination and assures against surface imperfections.

My improved ironer preferably is from 30 to 36 inches long, or half again as long as the applicator lip is wide. Thus with an applicator lip 24 inches wide and traveling longitudinally 12 inches for each revolution of the pipe, a 24 inch helical ribbon will be laid during a given first revolution of a pipe. This will be ironed out or pressed by the following ironer. At the next revolution another 24 inch ribbon helix will be laid, one half of the width thereof being shingled over the previously laid helix, and this second application will again be ironed out. As the device travels forward another 12 inches the ironer will pass over the completed coating a third time because of the fact that it projects approximately 12 inches to the rear of the applicator lip as indicated in Figures 1 and 4 of the drawings.

It is of course to be understood that the details of structure and arrangement of parts may be variously changed and modified without departing from the spirit and scope of my invention.

I claim:

1. A pipe coating ironer including a longtiudinal body having a pipe contacting surface, and mounting means including devices enabling adjustment of said body vertically and longitudinally.

2. A pipe coating ironer comprising a longitudinal standard carrier body, a selective coating engaging shoe removably mounted on said carrier, and means mounting said carrier to permit pivotal, longitudinal and vertical movement thereof.

3. A pipe coating ironer comprising a longitudinal ironer body having a longitudinal dovetail groove therein, mounting lugs having portions slidably receivable in said groove, and means for clamping said lugs at adjusted positions in said groove.

4. A pipe coating ironer comprising a longitudinal ironer body having a longitudinal dovetail groove therein, mounting lugs having mounting apertures therein and portions slidably receivable in said groove, means for clamping said lugs at adjusted positions in said groove, and vertically adjustable hanger rods having portions pivotally receivable in said apertures.

5. A pipe coating ironer comprising a longitudinal standard carrier body having a longitudinal dovetail groove therein, a selective coating engaging shoe removably mounted on said carrier, mounting lugs having mounting apertures therein and portions slidably receivable in said groove, means for clamping said lugs at adjusted positions in said groove, and vertically adjustable hanger rods having portions pivotally receivable in said apertures.

6. A pipe coating ironer comprising a longitudinal standard carrier body having a longitudinal dovetail groove therein, means for applying heat to said carrier, a selective coating engaging shoe removably mounted on said carrier, mounting lugs having mounting apertures therein and portions slidably receivable in said groove, means for clamping said lugs at adjusted positions in said groove, and vertically adjustable hanger rods having portions pivotally receivable in said apertures.

7. A pipe coating ironer comprising shell like carrier and shoe portions removably attached whereby to form therebetween a hollow portion, and heating means disposed in said hollow portion.

8. A pipe coating ironer comprising a longitudinal carrier body having a recessed under surface, a selective coating engaging shoe removably secured to said carrier in opposition to said recesses, and heating means mounted in said recess.

9. A pipe coating ironer comprising a longitudinal carrier body having a recessed under surface, a selective coating engaging shoe removably secured to said carrier in opposition to said recess, and a resistance heater element removably receivable in said recess.

10. A pipe coating ironer comprising a longitudinal carrier body having a recessed under surface, a selective coating engaging shoe removably secured to said carrier in opposition to said recess, a resistance heater element removably receivable in said recess, said carrier body having a longitudinal dovetail groove therein, mounting lugs having mounting apertures therein and portions slidably receivable in said groove, and means for clamping said lugs at adjusted positions in said groove.

11. A pipe coating ironer comprising a longitudinal carrier body having a recessed under surface, a selective coating engaging shoe removably secured to said carrier in opposition to said recess, a resistance heater element removably receivable in said recess, said carrier body having a longitudinal dovetail groove therein, mounting lugs having mounting apertures therein and portions slidably receivable in said groove, means for clamping said lugs at adjusted positions in said groove, and vertically adjustable hanger rods having portions pivotally receivable in said apertures.

DAVID W. BOYLAN.